Aug. 28, 1934.    A. C. ROWLEY    1,972,034
AUTOMATIC DRAIN VALVE
Filed Nov. 17, 1932    3 Sheets-Sheet 1
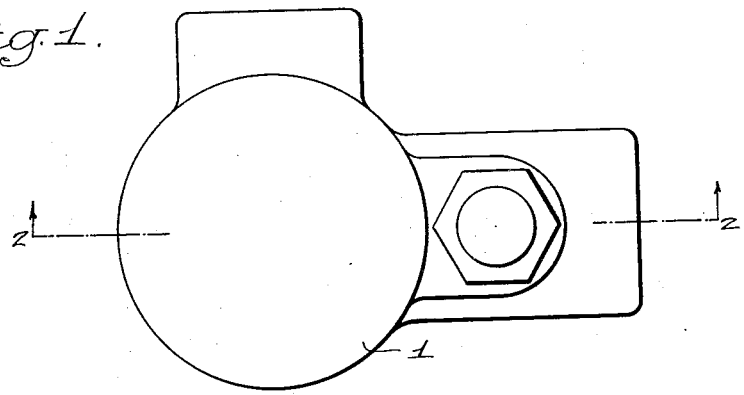
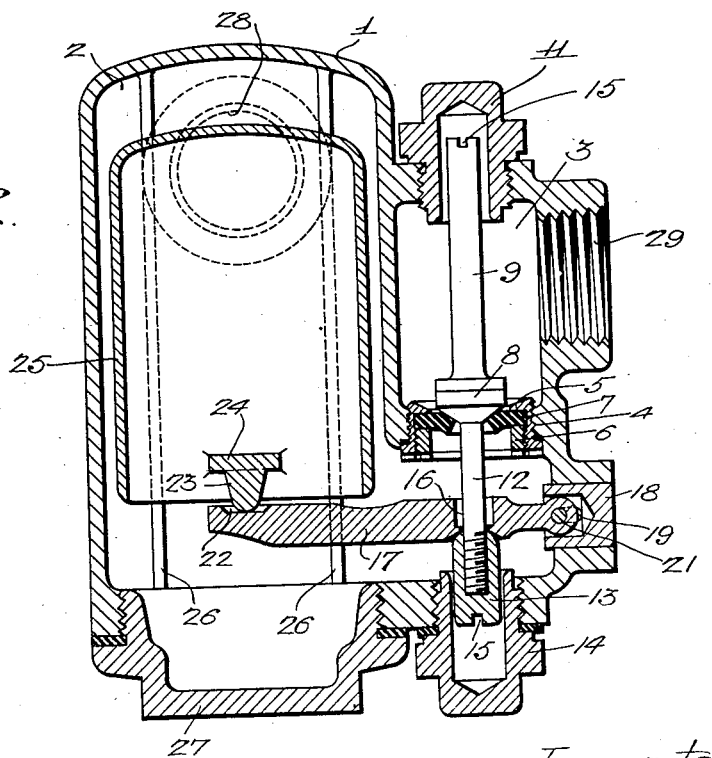

Aug. 28, 1934.  A. C. ROWLEY  1,972,034
AUTOMATIC DRAIN VALVE
Filed Nov. 17, 1932  3 Sheets-Sheet 2
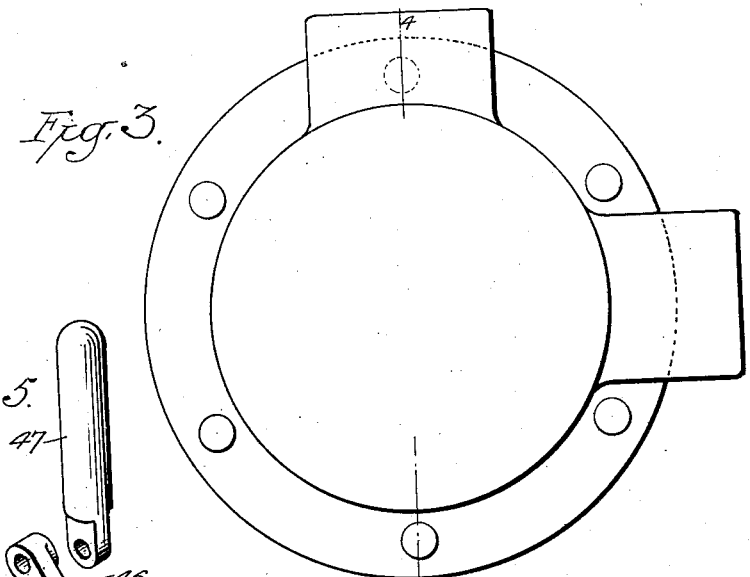
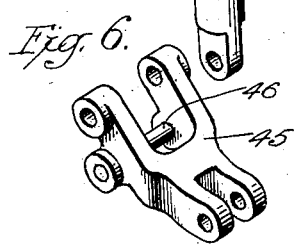
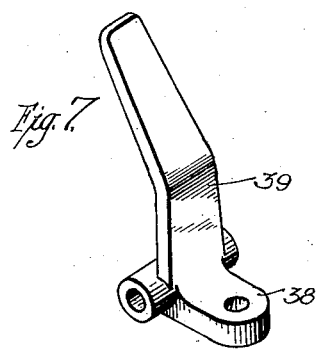
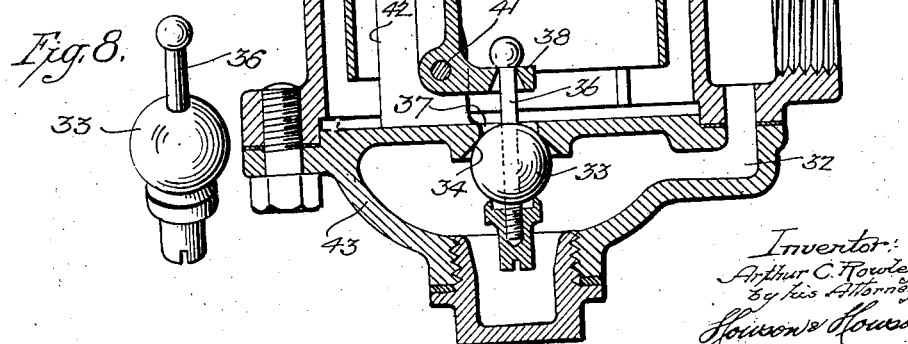

Aug. 28, 1934.  A. C. ROWLEY  1,972,034
AUTOMATIC DRAIN VALVE
Filed Nov. 17, 1932  3 Sheets-Sheet 3
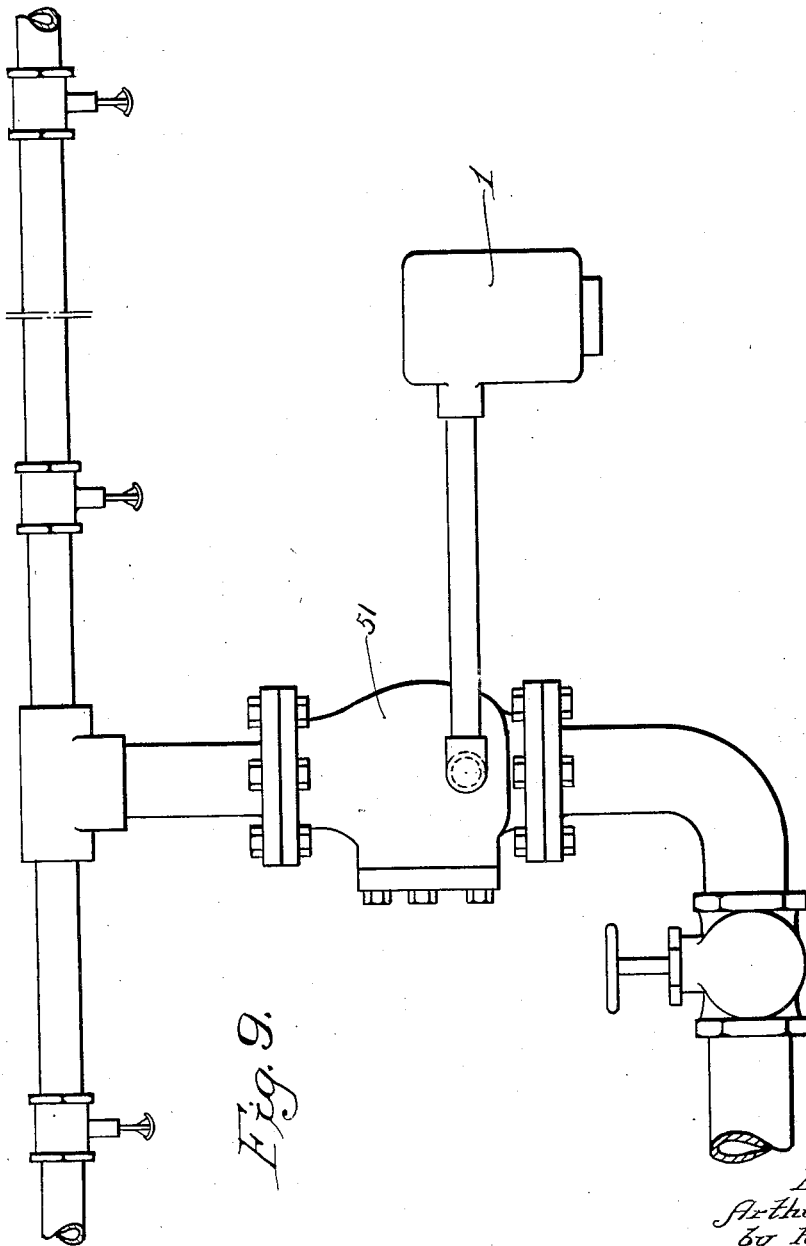

Patented Aug. 28, 1934

1,972,034

UNITED STATES PATENT OFFICE 1,972,034

AUTOMATIC DRAIN VALVE

Arthur C. Rowley, Drexel Hill, Pa., assignor to Globe Automatic Sprinkler Company, Philadelphia, Pa., a corporation of Pennsylvania Application November 17, 1932, Serial No. 643,097

1 Claim. (Cl. 169—17)

The principal object of this invention is to provide a novel valve device adapted particularly for use in dry pipe sprinkler systems and combining the characteristics both of an automatic drain valve and a pressure relief valve.

Another object of the invention is to provide a valve of the stated character having certain novel structural and mechanical features and details hereinafter set forth and illustrated in the attached drawings, in which:

Figure 1 is a top plan view of a valve made in accordance with my invention;

Fig. 2 is a section on the line 2—2, Fig. 1;

Fig. 3 is a top plan view of a modified form of valve within the scope of my invention;

Fig. 4 is a section on the line 4—4 of Fig. 3;

Figs. 5 to 8 inclusive are detached views in perspective of elements of the embodiments shown in Figs. 3 and 4; and Fig. 9 is a diagrammatic view showing a fire extinguishing system comprising my invention.

With reference to the drawings, 1 is the body or casing of the valve, which in its interior comprises a float chamber 2 and a valve chamber 3. Threaded into the housing at the bottom of the chamber 3 is an annular member 4 having at its upper end an inwardly projecting flange 5. The member 4 is interiorly threaded at its lower end for reception of a ring 6, the function of this ring being to confine between itself and the underside of the flange 5 a flexible diaphragm 7 in the form of a flat annulus. As illustrated, this flexible annulus 7, which preferably is of flexible rubber, extends inwardly beyond the inner peripheral edge of the flange 5 and constitutes a seat for a valve 8 formed on a stem 9. The stem 9 extends upwardly through the chamber 3, and its upper end occupies the interior chamber of a plug 11 threaded into the casing 1 at the top of the chamber 3. The stem 9 also has a reduced extension below the valve 8, this extension, which is designated by the reference numeral 12, being threaded at its lower end for reception of a nut 13 which embraces the lower extremity of the stem as illustrated. This nut occupies the interior chamber of a plug 14 threaded into the casing 1 at a point directly below and in substantial alignment with the chamber 3. It will be noted that both the upper end of the stem 9 and the lower end of the nut 13 are provided with slots 15 for reception of a screw driver or similar tool, whereby the stem and the nut may be rotated relative to each other.

The lower extension 12 of the stem 9 extends through an opening 16 in a lever 17 which is pivotally mounted in a bearing block 18 inserted in an opening in the casing 1. The block 18 is slotted as indicated at 19 for reception of a pin 21 which constitutes the pivot pin for the lever 17. It will be noted that the lever 17 is provided with a socket for reception of the rounded upper end of the nut 13 upon which the lever normally rests. The outer end of the lever 17 lies in the lower end of the float chamber 2 and is recessed at 22 for reception of a depending lug 23 formed on a cross piece 24 extending transversely across the lower open end of a float 25. The float takes the form, as shown, of an inverted cup and is guided for vertical movement within the float chamber 2 by ribs 26 projecting from the inner wall of the casing 1. It will be apparent that the float 25 acts normally as a weight bearing upon the end of the lever 17, and thereby, through the medium of the nut 13 and the stem extension 12, holding the valve 8 upon its flexible seat 7. Obviously, pressure applied to the valve from the interior of the casing or from the chamber 2 will tend to force the flexible rubber annulus 7 more firmly against the valve to thereby effectively seal the chamber 2 from the chamber 3.

It will be noted further that the casing 1 includes a plug 27 threaded into the casing 1 at the bottom of the chamber 2, this plug being of sufficient diameter to permit, when removed, insertion of the cup 25 into the chamber. Each of the plugs 14 and 27 is provided with a gasket to form a hermetically sealed joint. The casing 1 is provided with an intake port 28 which opens into the upper end of the chamber 2 and with an outlet or discharge port 29 opening from the chamber 3.

Assuming that the intake port 28 is connected in a dry pipe system of automatic sprinklers adjacent the water clapper, as shown in Fig. 9 wherein the dry pipe valve is designated by the reference numeral 51, water leaking or accidentally passing into the dry pipe system through the water valve or condensation from sprinkler system enters the float chamber 2, and when the accumulation of said water reaches a predetermined maximum, the float 25 is carried upwardly by the air entrapped in its interior. Such upward movement of the float 25 relieves the weight upon the outer end of the lever 17 and through said lever upon the valve 8, whereupon the latter is free to move upwardly from its seat under the pressure applied from the dry pipe system. The air pressure in the system then acts to expel the water from the chamber 2 into the chamber 3, and thence through the port 29 to a mechanical alarm or exhaust. As the water falls in the chamber 2, the float 25 moves downwardly until its weight again is applied to the outer end of the lever 17, whereby the valve 8 is returned to its seat and the system again sealed. If from any cause the pressure within the dry pipe system increases beyond a predetermined maximum, this pressure will act directly upon the under side of the valve 8 to unseat it, to thereby permit escape from the system of the excess pressure. The maximum pressure which must be overcome by the system pressure operating against the valve 8 in order to unseat the latter may be controlled by the weight of the float 25.

It is apparent, therefore, that I have provided not only an efficient automatic float drain valve of desirable sensitivity and simplicity of form, but have also introduced into the valve the characteristics of a pressure relief valve which also acts automatically to relieve excessive pressures within the system to which the valve may be attached. The valve is particularly well adapted for use with dry pipe sprinkler systems, see Fig. 9, since it offers an effective means for ridding the dry pipe system of water escaping past the dry pipe valve and for maintaining a safe maximum pressure within the dry pipe system. Attention is directed to the form of the flexible seat 7 for the valve 8. This seat being flexible conforms itself readily to the contacting surfaces of the valve 8, thereby insuring an efficient seal, and the pressure within the chamber 2 also functions to force this flexible seat member against the contacting surface of the valve 8 to thereby form an effective seal precluding escape of the system pressure. The device while simple in form is highly efficient in operation.

In the embodiment shown in Figs. 3 to 8 inclusive the float chamber 31 is normally separated from the discharge chamber 32 by means of a ball valve 33 located in said discharge chamber, and normally held in an elevated position and against its seat at 34 by the weight of the float 35 in the chamber 31. The ball valve 33 has a stem 36 extending upwardly through the port 37, and this stem is supported in a horizontally projecting arm 38 of a bell crank lever 39 pivoted at 41 to a bracket arm 42 projecting upwardly from the base member 43 of the casing and into the float chamber 31. At the top of the bracket 42 is a pivotally secured at 44 a second lever 45, see Fig. 6, and this lever which is bifurcated carries a cross pin 46 which is adapted to engage the upper end of the lever 39, as is shown in Fig. 4. The lever 45 carries an upwardly extending pin 47 which fits into a socket 48 in the underside of the float 35, the float thereby acting normally as a weight to depress the lever 45, and react through this lever upon the lever 39 to hold the ball valve 33 in the elevated or seated position, closing the port 37. Any water entering the float chamber through the port 49 will accumulate in the chamber and eventually will cause an elevation of the float 35, thereby relieving pressure upon the lever 39 and permitting the ball valve to drop, thereby opening the port 37 and permitting the pressure within the dry pipe system to discharge the water from the discharge port 51.

The operation of this valve is in principle similar to that of the valve previously described and illustrated in Figs. 1 and 2. This valve, however, is slightly more compact and less expensive to manufacture.

I claim:

In fire-extinguishing apparatus, the combination with a dry pipe system, of a valve controlling flow of water to said system, a chamber connected with said system in position to collect small quantities of water entering the system through said valve, said chamber having a discharge port, a valve normally closing said port, and a float in said chamber operatively connected with the valve whereby the weight of the float normally retains the valve to its seat against the displacing effect of fluid pressure in the dry pipe system while permitting the valve to open for relief of excessive pressure in said system, and whereby elevation of said float by accumulations of water entering as set forth releases the valve to permit said fluid pressure to discharge the water from the chamber.

ARTHUR C. ROWLEY.